(No Model.)
G. HUNT.
BAG HOLDER.
No. 507,542. Patented Oct. 31, 1893.
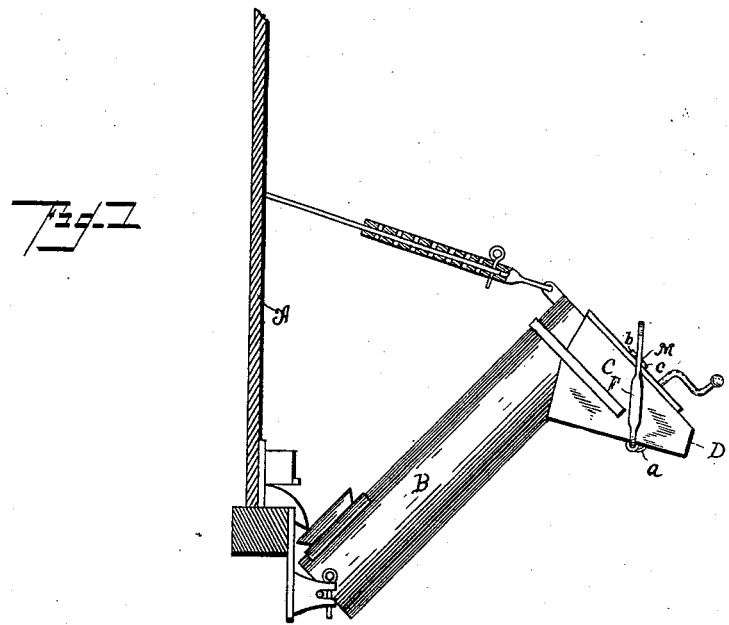
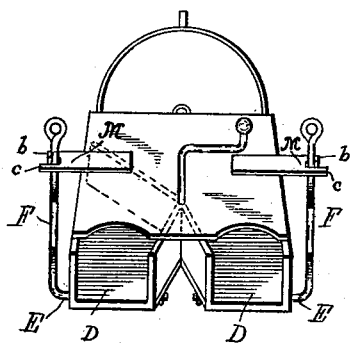
Witnesses
G. T. Myers
C. S. Frye
Gilbert Hunt
Inventor
By W. T. Fitzgerald
Attorneys

UNITED STATES PATENT OFFICE.

GILBERT HUNT, OF WALLA WALLA, WASHINGTON.

BAG-HOLDER.

SPECIFICATION forming part of Letters Patent No. 507,542, dated October 31, 1893.

Application filed June 6, 1892. Serial No. 435,694. (No model.)

*To all whom it may concern:*

Be it known that I, GILBERT HUNT, a citizen of the United States, residing at Walla Walla, in the county of Walla Walla and State of Washington, have invented certain new and useful Improvements in Bag-Holders; and I do hereby declare the following to be a full, clear, and exact description of the invention, such as will enable others skilled in the art to which it appertains to make and use the same.

My invention has relation to improvements in bag holders for grain sacking machines, and it has for its general object to provide a bag holder of a construction adapted especially for use in conjunction with the grain sacking machine disclosed in my application for Letters Patent, filed January 22, 1892, Serial No. 418,918.

To the attainment of the foregoing object, the invention consists in the peculiar construction, certain novel combinations and the adaptation of parts hereinafter described and claimed.

For the better understanding of my improved bag holder, I have illustrated the same in conjunction with the sacking machine claimed in my prior application aforesaid.

In the accompanying drawings:—Figure 1 is a side elevation of my improved bag holder in position upon the grain sacking machine. Fig. 2 is a front elevation of the chute of the grain sacking machine, with my improved bag holder in position thereon, and Fig. 3 is an enlarged perspective view of one of the rock-shafts removed.

In the said drawings similar letters designate corresponding parts throughout the several views, referring to which—

A, indicates one of the side walls of a thrashing machine or the like; B, indicates the inclined conveyer of a grain sacking machine, and C, indicates the downwardly inclined bifurcated chute of the same, which is preferably provided with a valve as shown in dotted lines adapted to close one of the branch chutes D, and open the other for a purpose presently perceived.

Journaled in suitable bearings upon the under side of the branch chutes D, are rock-shafts E, which are provided at intervals in their length with teeth *a*, which are preferably curved upwardly and rearwardly, as illustrated in Fig. 3 of the drawings, so as to better engage and hold a bag. These rock-shafts E, are provided at their outer ends with integral angular, handle branches F, which are flattened for a portion of their length, so as to render them resilient, for a purpose presently to be described.

Fixedly connected to the upper or front side of the chute casing and extending laterally therefrom, are the fixed catches M, which have their free ends furcated to form a seat for the handle branches F, of the rock-shafts E, which branches F, are rendered resilient as before described, whereby they may be sprung into the seats at the ends of the catches M, so as to prevent a casual disconnection of the bags from the chute branches.

As better illustrated in Fig. 2 of the drawings, the rear branch *b*, of the furcated ends of the catches M, is shorter than the forward branch *c*, thereof, whereby it will be seen that the handle branches F, can only be unlocked by being moved rearwardly so that the rock-shafts carrying the teeth *a*, will normally rest in a position ready to engage and hold a bag.

In operation, the edges of the bags to be held are placed between the teeth *a*, of the rock-shafts E, and the under side of the chute C, and the handle branches F, are turned up and seated in the furcated ends of the catches M, when the bags will be securely held in position to receive grain from the chute branches.

By the provision of two independent rock-shafts in conjunction with the bi-furcated chute C, having a valve, as stated, it will be readily perceived that while one bag is being filled, the other may be removed and an empty bag placed in its position.

Having thus described my invention, what I claim, and desire to secure by Letters Patent, is—

The combination with a chute having a lateral catch, of a rock shaft journaled in bearings under the chute, said rock shaft comprising two parts united at right angles, or nearly so, one of the parts being provided with teeth, the other part serving as a handle, said handle being made of spring metal and adapted to move in the path of the catch so as to fasten or release a bag, substantially as set forth.

In testimony whereof I affix my signature in presence of two witnesses.

GILBERT HUNT.

Witnesses:
F. W. EATON,
W. I. CANVEL.